United States Patent [19]

Phillips, Jr.

[11] 4,196,435

[45] Apr. 1, 1980

[54] RADAR PULSE PHASE CODE SYSTEM

[75] Inventor: Calvert F. Phillips, Jr., Cape St. Claire, Md.

[73] Assignee: The United States of America as represented by the Secretary of the Air Force, Washington, D.C.

[21] Appl. No.: 662,194

[22] Filed: Aug. 21, 1967

[51] Int. Cl.² ............................................. G01S 9/233
[52] U.S. Cl. ............................................. 343/17.2 PC
[58] Field of Search ................ 343/17.1, 17.2, 17.5, 343/17.2 R, 17.2 PC

[56] References Cited

U.S. PATENT DOCUMENTS

| 3,366,955 | 1/1968 | Mattern ........................ 343/17.2 X |
| 3,371,343 | 2/1968 | Sones ........................... 343/17.2 |

*Primary Examiner*—T. H. Tubbesing
*Attorney, Agent, or Firm*—Joseph E. Rusz; Julian L. Siegel

[57] ABSTRACT

A radar system for reducing the effective width of a transmitted pulse without increasing power utilizing coded phase shifting. Discrete parts of the transmitted pulse are phase shifted 180° and upon return to the receiver the pulse is decoded by a sequence of delay lines and phase shifters positioned in accordance with a predetermined code rendering all the discrete parts in phase which are then summed.

1 Claim, 6 Drawing Figures

RADAR PULSE PHASE CODE SYSTEM

This invention relates to a pulse radar system, and more particularly, to a radar system that is operative in extended clutter. As is well known, one of the greatest radar problems in existence today is the problem of weather clutter and chaff. Also associated with this problem is the overall general problem of anti-jamming requirements for radar systems. This invention is a radar technique to cope with such weather, chaff, etc.

Improved target detectability for aircraft within extended clutter is possible for a radar system by reducing transmitted pulse width. For example, a 10:1 decrease in pulse width will give a 10:1 or 10 db decrease in extended clutter return. The target amplitude will remain the same as long as the power within the transmitted pulse is held constant. Consequently, a 10 db effective sub-clutter visibility could be obtained by decreasing the pulse width 10:1.

Unfortunately, a direct decrease in pulse width would require a proportional increase in peak transmitted power. An increase in power is not feasible in many cases because of power breakdown of microwave and waveguide components. However, this invention offers an approach in obtaining an effective reduction in pulse width without an increase in peak power. This approach has the general name of pulse coding with many pulse coding techniques applicable. Of the various possible types of pulse coding, a technique known as pulse phase coding is presented in this invention.

The pulse phase system herein described is a practical system which may be applied to many existing radar systems to effectively improve their operation under many conditions and to especially improve their operation against extended clutter. This system is of particular value in that a modification can be made to present radars with a very minimum change to existing hardware.

It is therefore an object of this invention to provide a radar effective in extended clutter.

It is another object to provide a radar system for reducing the effective width of a transmitted pulse without reducing power.

It is still another object to provide a pulse code technique for improving target detection in extended clutter.

These and other advantages, features, and objects of the invention will become more apparent from the following description taken in connection with the illustrative embodiments in the accompanying drawings, wherein.

If, during the transmitted radar pulse, the phase of the transmitted energy is shifted in abrupt discrete intervals by 180°, the radar pulse will be pulse phase coded. The exact number and timing of the phase shifted intervals must be made in accordance with predetermined codes. Of these codes, 7, 11, and 13 bit codes are generally the most applicable. This invention is described with the 7 bit code for use with a 6 μsec pulse width. However, it is understood that the invention is not limited to this code. Dividing the 6 μsec pulse into 7 parts, each part has a width of 0.857 μsec which is shown in FIG. 1a.

Figure 1A:
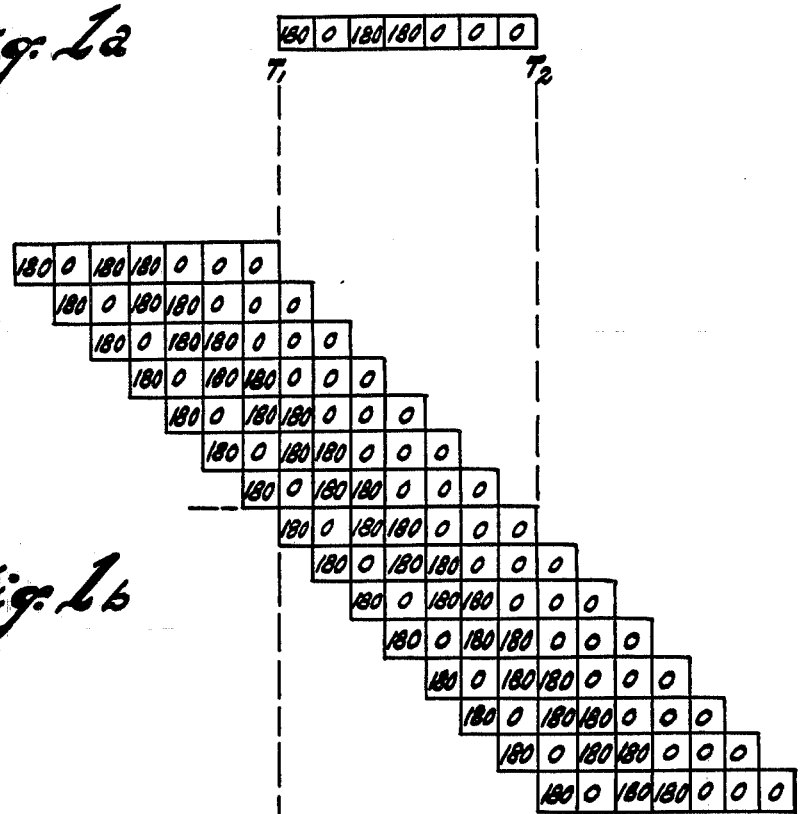
FIG. 1a–1c is a diagram showing decoder output versus time.

Having coded the transmitted pulse, as shown in FIG. 1a, the receiver must be arranged to identify the bits in terms of their relative phase shift, i.e. 0° or 180°. Of the various possible methods which may be employed to decode the coded pulse, the most direct is to employ delay lines and phase shifters with coherent summing.

Figure 1B:
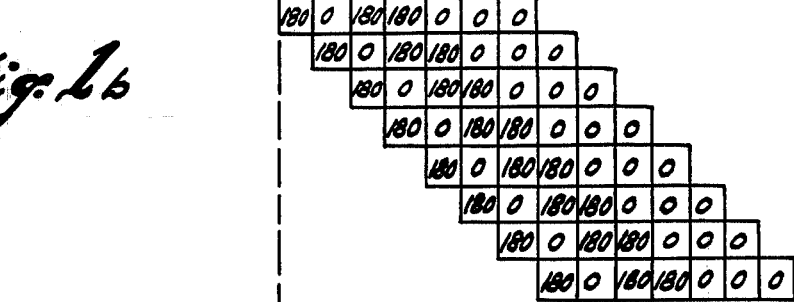

To consider the operation of the pulse phase code system, first consider a point target return. The operation of the system can be effectively shown by adding the returns in 0.857 μsec intervals from the time the leading edge of the pulse packet leaves the target until the time the trailing edge of the pulse leaves the target. As shown in FIGS. 1a and 1b, it is seen that the unique phase code arrangement gives complete cancellation or a value of one except for the exact time when the pulse is coincident with the decoding unit, at which time all decoding units are in phase to give a value of seven. Only this perfect code can give this result with all other arrangements giving other values. From a graphic analysis of FIG. 1b, which shows the pulse position in time as it passes through the decoder $T_1$ to $T_2$, it is seen that the phase coded pulse system is capable of producing an output equivalent to short pulse operation without actually transmitting a short pulse.

Figure 1C:
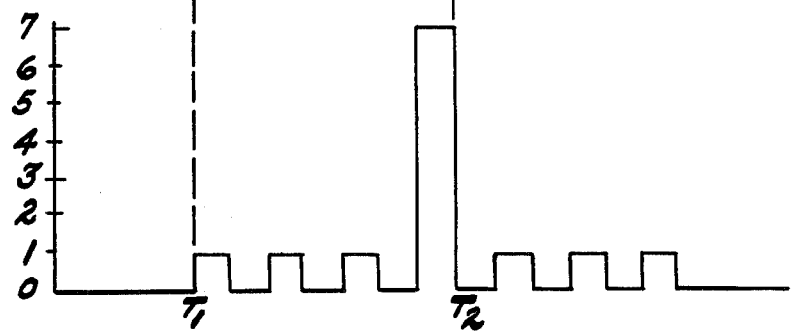

Since the addition of the pulse components shown in FIG. 1c is coherent addition in terms of voltages and shows the resultant output from the decoder, the pulse power is then $7^2$ or 49 times as great as the original pulse since $P=E^2/R$. However, the bandwidth of the receiver must be in terms of the reconstructed pulse instead of the original pulse, which means in this case, a 7:1 increase from, for instance, 200 kc for the 6 μsec pulse to 1.4 mc for the 0.857 μsec pulse. This system also samples 7 bits of noise which add up in terms of voltage to 49 with the RMS value being $\sqrt{49}$ or 7. The resultant 7:1 increase in the bandwidth of the noise times the 7:1 increase in noise amplitude then gives a net increase of 49:1, the same increase as for the signal. As a result, the detectability of the radar system for either the coded or the uncoded system does not change. However, a great deal of care must be taken in the design and construction of the hardware to prevent losses due to improper phasing or slow switching.

The performance of the phase coded pulse system within extended clutter is explained by first, assuming a condition where there is homogeneous extended clutter received by the radar with a target return, located in the clutter, whose amplitude is equal to the amplitude of the uncoded 6 μsec pulse. The decoder receives both the clutter and target power. The target return, being in accordance with the code requirements, adds coherently. However, the clutter being composed of random scatters distributed within the space of the radar cell cannot be considered as having a series of returns having any particular code. The clutter phase must be considered in terms of statistics with the root mean square value being applicable. Thus the target power would be 49 units and the clutter power would be $\sqrt{49}$ or 7 units in the output with a net improvement on a statistical basis being 7:1 for the coded pulse system. In practice, it must be recognized that the instantaneous value may be better or worse than the 7:1 value although the result can never be worse than the original uncoded pulse condition.

For radar systems operating into automatic data processing systems, the false data count generated by extended clutter is an important factor. False data generated by the radar can occupy the storage within the processor, with the result being that desired target information could be lost. For the pulse phase code system, the amplitude of clutter is reduced as compared to the uncoded system. This reduced clutter amplitude is not a true reduction but is a result of the increase of the noise power. Consequently, for the same threshold setting in terms of the same false alarm rate on system noise alone, a decrease in the data count for extended clutter, such as from weather clutter, would result from the use of the pulse phase coded system. Of particular interest is the fact that this reduction also takes place for the leading edges of extended clutter since the decoder unit is effectively decorrelating the leading edge as long as the clutter is twice as long as the original transmitted pulse.

The encoder produces a 180° phase shift into the transmitted pulse during the time required in accordance with the code arrangement. Of prime importance is the requirement that the switching time be held to a minimum since the transmitter is not being used efficiently during the switching period which represents a loss of effective radiated power. Also, the frequency sensitivity of the encoder should be a minimum so that it will not limit future very rapid frequency tunability of the radar. Of course, the encoder must have the power handling capability for the specific requirement.

Figure 2:
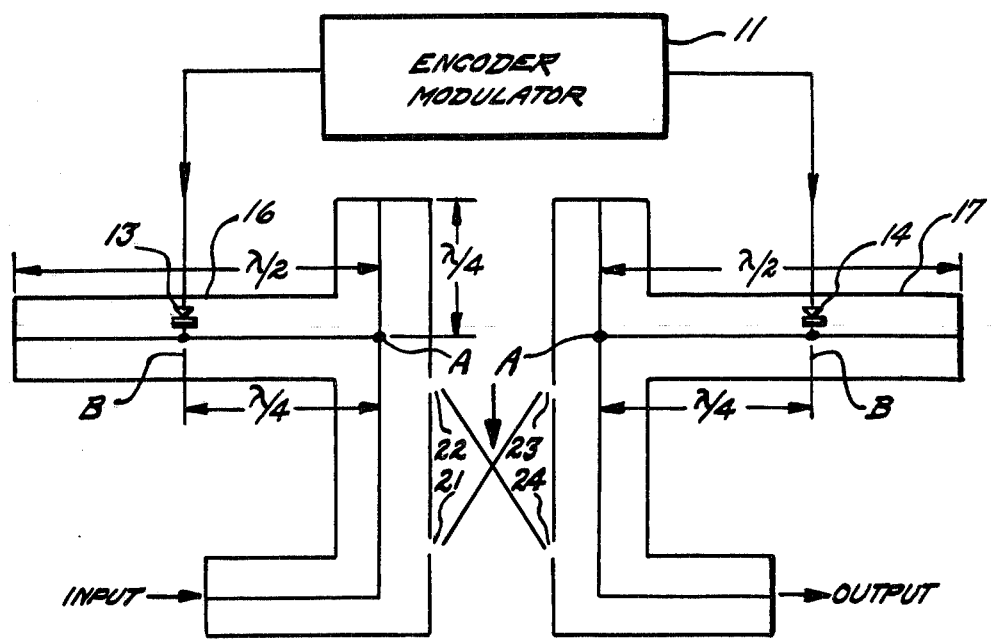
FIG. 2 is a diagram of the encoder.

A phase shifter which can be used in conjunction with this invention is shown in FIG. 2, which uses diode switches in a coaxial hybrid arrangement. First, considering diodes 13 and 14, which can be activated by modulator 11, to be in the OPEN condition, i.e. no modulation voltage applied to the diodes, then the $\lambda/2$ stubs 16 and 17 reflect a short circuit at points A in stubs 16 and 17. The energy entering the input and connecting port 21 of the hybrid divides equally with half of the energy at port 22 and half of the energy at port 23. The energy then reflects from the apparent short at points A and then recombines at port 24 of the hybrid. When diodes 13 and 14 are shorted by means of the applied modulating voltage from modulator 11, the shorted diodes place a high impedance in parallel with the line at points A. The actual shorts at points B now come into effect, which are quarter-wavelengths from previous shorts at points A. The energy then travels an additional half-wavelength or twice the quarter-wavelength distance to give the required 180° phase shift for the energy at port 24. The diodes may have a 10 to 15 nsec switching time which allows for very rapid switching of the required 180° phase shift. The encoder can be located in series with the transmitter drive at any convenient point.

To ensure that the rf pulses have the exact length required with good rise and fall times, the encoder modulator generates a 6 $\mu$sec pulse to an on-off diode switch which is in series with the encoder. The rf drive pulse to the encoder must be longer than 6 $\mu$sec.

A function of the encoder and pulse shaping switch modulator is to switch the diodes in the encoder in the pulse shaping switch at the proper time in accordance with the pulse width and code requirements.

Figure 3:
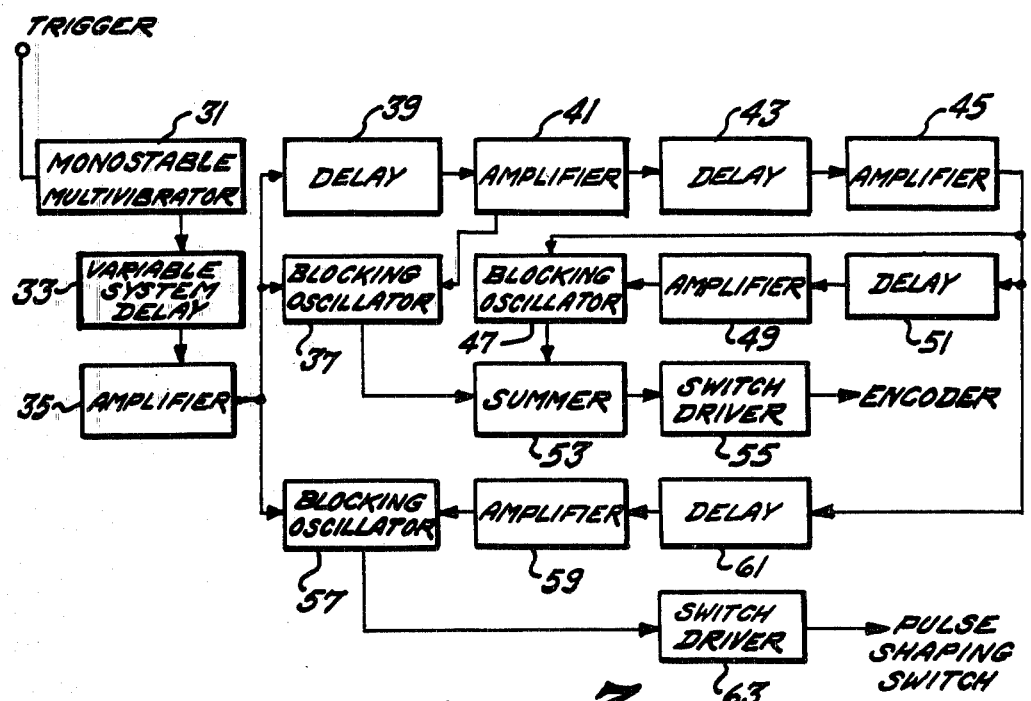
FIG. 3 is a block diagram of the encoder modulator.

Referring to FIG. 3 showing a block diagram of the modulator unit, the normal system trigger is applied to multivibrator 31, with output time applied to variable delay circuit 33, so that the encoder modulator output timing is in accordance with the timing of the pulse to be modulated. The delay video pulse, which has a very sharp rise time of 10 to 15 nsec, is then applied to amplifier 35 having three outputs; one output triggers blocking oscillator 37 to the ON state; another output passes through delay line 39 which has a delay of 0.857 $\mu$sec, is amplified by amplifier 41, and then used to turn blocking oscillator 37 to the OFF state. The third output of amplifier 35 places blocking oscillator 57 in the ON state. The output of blocking oscillator 37 is then a pulse with a width exactly equal to the delay of delay line 39. This process is then repeated sending the pulse through 0.857 $\mu$sec delay circuit 43 and amplifier 45 to place blocking oscillator 47 in the ON state. The pulse from amplifier 45 is also sent through 1.714 $\mu$sec delay circuit 51 and amplifier 49 to turn blocking oscillator 47 to the OFF state. The outputs of blocking oscillators 37 and 47 are summed in summer 53 and then fed to switch driver 55. The output from amplifier 45 is also fed to 2.571 $\mu$sec delay circuit 61 and then to amplifier 59 to switch blocking oscillator 57 to the OFF state. The output of blocking oscillator 57 controls switch driver 63 which is used for pulse shaping.

Due to the very accurate timing required for the modulating pulses plus the high frequency response required to obtain rise times of 10 to 15 nsec, broadband delay cables are used in the modulator unit. Because of the relatively high switching current required along with the rapid switching requirements, the switch driver 63 should utilize switching transistors in a push-pull arrangement.

Figure 4:
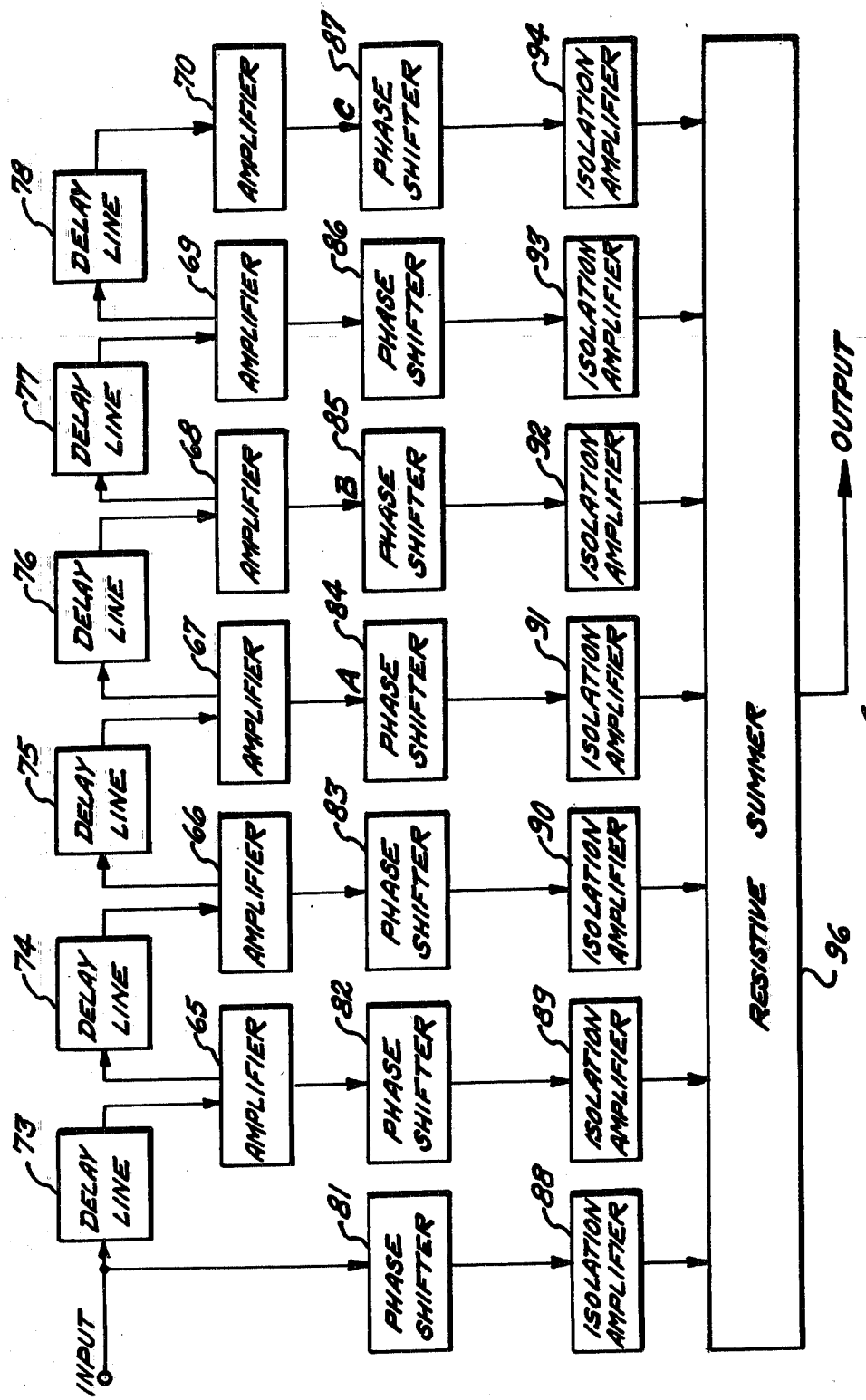
FIG. 4 is a block diagram of the decoder unit.

The decoder is shown in FIG. 4 in which amplifiers 65–70 are placed in series with each section of delay cables 73–78, the amplifiers being used to compensate for cable loss. To obtain proper phasing in the final output, short coaxial loops 81–86 can be added and in addition can be used to obtain the additional 180° phase shift at points A, B, and C. Isolation amplifiers 88–94 prevent the possibility of oscillation around the delay lines and provide proper output impedance to resistive coherent summer 96, which is standard in the art.

With the pulse coded system described in this application, no special receiver type is required. The input signal to the decoder has a bandpass in terms of the narrow reconstructed pulse and is limited on system noise. The output of the decoder then has a dynamic range equivalent to the pulse build-up. This dynamic range is 7:1 for the 7 pulse code, 11:1 for the 11 pulse code, etc. From the dynamic range viewpoint, the 13 pulse code would be best. The limiting action keeps the sidelobes of the pulse at noise level, which is a very important factor. The decoder output is detected and amplified as in any conventional system except that the video response must be in terms of the reduced pulse width.

The limiting action before the decoder does not prevent the detectability of targets and extended clutter when the target amplitude is larger than the clutter, as would happen in a normal system because the larger signal effectively captures the phase of the signal going into the decoder. This capture effect changes the input from the random input to the proper correlated input which in turn provides the correlated output. The system is thus sensitive only to the signal to clutter ratio but not the absolute level of either.

Although the invention has been described with reference to a particular embodiment, it will be understood to those skilled in the art that the invention is capable of a variety of alternative embodiments within the spirit and scope of the appended claims.

I claim:

1. A radar apparatus for reducing the effective width of transmitted pulses comprising:
   a. encoder means for shifting certain discrete bits of the transmitted pulse by 180° in accordance with a predetermined code;
   b. and decoding means for adding all the discrete bits of the returned signal for target identification, the encoder means including:
   1. a monostable multivibrator,
   2. a variable delay circuit fed by the monostable multivibrator,
   3. a first blocking oscillator activated by the output of the variable delay circuit,
   4. a first switch driver controlled by the first blocking oscillator for pulse shaping,
   5. a second delay circuit fed by the output of the variable delay circuit,
   6. a second blocking oscillator activated by the output of the variable delay circuit and deactivated by the output of the first delay circuit, and
   7. a second switch driver controlled by the output of the second blocking oscillator for phase shifting.

* * * * *